March 23, 1965 J. A. ROBERTS ETAL 3,175,061
MAXIMUM FLUID PRESSURE CONTROL DEVICE
Original Filed Sept. 30, 1957
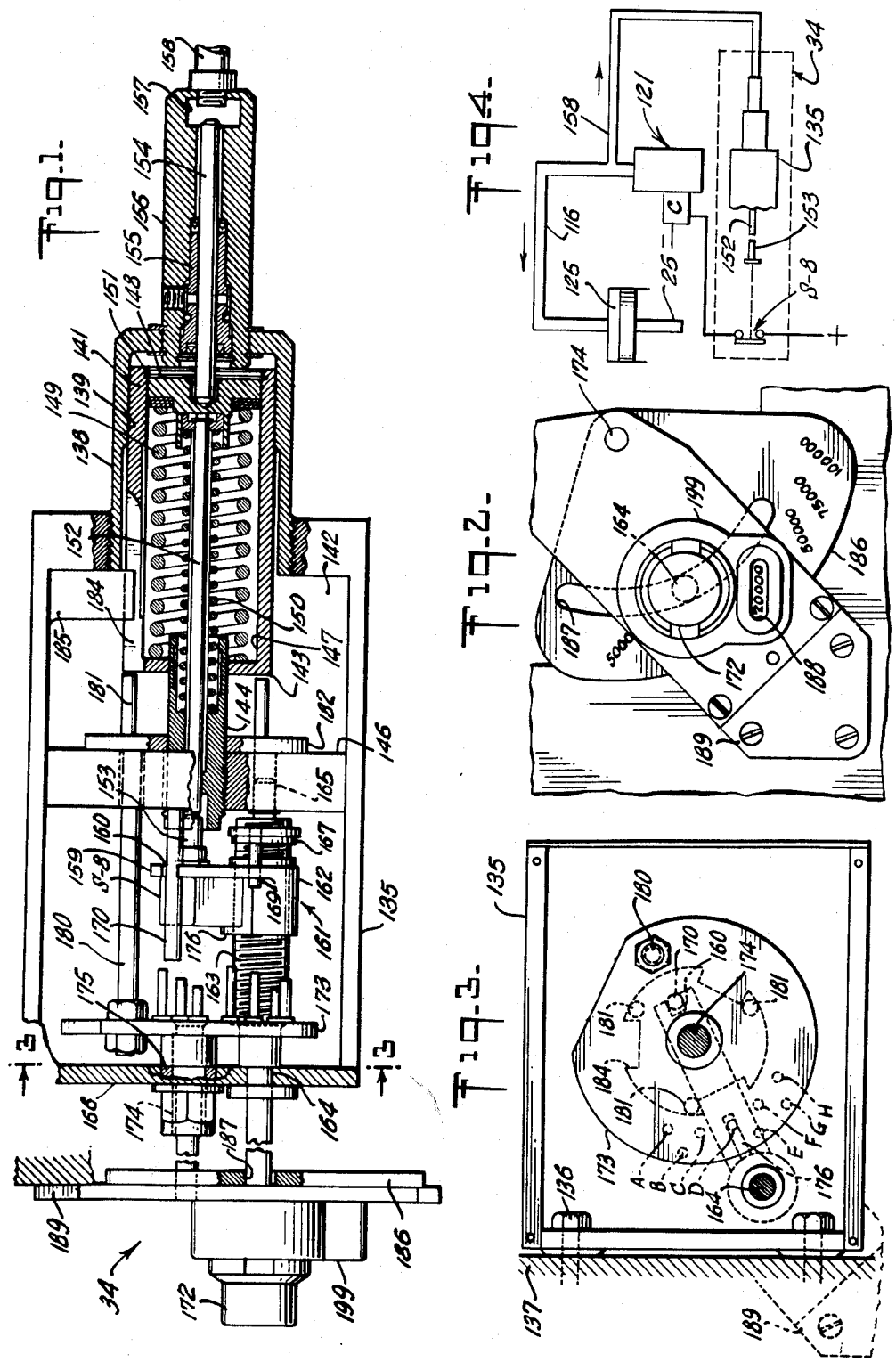

United States Patent Office 3,175,061
Patented Mar. 23, 1965

3,175,061
MAXIMUM FLUID PRESSURE CONTROL DEVICE
James A. Roberts and Howard R. Fischer, Utica, N.Y., assignors to Chicago Pneumatic Tool Company, New York, N.Y., a corporation of New Jersey
Original application Sept. 30, 1957, Ser. No. 686,964, now Patent No. 2,966,195, dated Dec. 27, 1960. Divided and this application Oct. 17, 1960, Ser. No. 62,978
14 Claims. (Cl. 200—82)

The present invention is a division of our co-pending application, Serial No. 686,964, filed September 30, 1957, for a Dimpling Machine, and issued December 27, 1960, as Patent No. 2,966,195.

The invention disclosed herein is directed to a maximum hydraulic pressure control device. It is useful in controlling the operations of hydraulic presses. It is adapted to be connected in the output line of the hydraulic pressure fluid system of a hydraulic press; and it is designed to allow the output pressure or hydraulic compressive force of the system acting upon the associated press to build up to a predetermined maximum. When the pressure reaches this maximum, the control device automatically operates to discontinue further compressive action of the hydraulic pressure fluid system and the associated press.

A feature of the invention lies in selective means for pre-setting the maximum hydraulic pressure at which operation of the associated hydraulic pressure fluid system is to discontinue.

A further feature of the invention lies in a certain advantageous arrangement whereby operation of the associated hydraulic pressure fluid system is automatically terminated when the pre-set maximum hydraulic pressure is reached.

The invention is especially suited for use with hydraulic presses, such as dimpling machines, capable of exerting high compressive hydraulic forces. The device of the present invention has a pressure control range from 2500 lbs. to 100,000 lbs. Any pressure in this range may be selected and pre-set as the maximum hydraulic pressure that will be permitted to be developed by an associated hydraulic pressure fluid system against a hydraulic press. When such pressure is reached, the maximum hydraulic pressure control device will automatically respond to discontinue further compressive action of the hydraulic pressure fluid system and the associated press. Where such high pressures are involved in a work operation, an efficiently operating and practical device is essential for controlling the maximum pressure that is to build up against the press; for if the pressure builds up to a degree more than required, the work may be ruined; or if the pressure is not built up to a proper degree, operation of the press will be ineffectual.

An object of the invention is to provide a maximum hydraulic pressure control device which is practical in construction, efficient in operation, and compact in size.

Another object of the invention is to provide a maximum hydraulic pressure control device applicable to hydraulic presses, wherein selective means is provided for pre-setting the maximum hydraulic pressure that may be built up in a particular operation, and wherein cut-off means is automatically operable to cut off operation of the press when the maximum preset pressure is reached.

A further object of the invention is to provide a maximum hydraulic pressure control device which is suitable for controlling the operation of a hydraulic press that is capable of exerting a range of high compressive forces.

The invention further lies in the particular structure and novel arrangement of its various components, and also in their cooperative association with one another to effect the results intended herein.

In the drawings:

FIG. 1 is a longitudinal section through a maximum hydraulic pressure control device embodying the invention;

FIG. 2 is a front end view of FIG. 1;

FIG. 3 is a front end view of FIG. 1, taken on the line 3—3; and

FIG. 4 is a schematic diagram illustrating the association of the invention with a hydraulic press.

The maximum hydraulic pressure control device 34 embodying the present invention has a casing 135 adapted to be mounted by bolts 136 to a suitable support 137. A reduced axial extension 138 at the rear of the casing provides a chamber 139 for a slidable sleeve 141. The forward end of this sleeve projects part way into a relatively larger chamber 142 of casing 135. A wall 143 closing over the front end of the sleeve is axially supported for sliding movement upon a stub shaft 144, the forward end of which shaft is threaded fast into and projects slightly through the opposite face of a fixed radial rib 146 of the casing. Sleeve 141 provides a chamber 147 for a pressure responsive piston 148 which is loaded by a heavy high pressure coil spring 149 to the rear of the chamber into abutment with a retaining ring 151. A light low pressure center coil spring 150 retained at its ends in opposed recesses of the stub shaft 144 and of a bossed part of the piston 148, aids spring 149 in loading the piston to the rear of the chamber 147, and also serves to load sleeve 141 to the rear of its chamber 139. A switch actuator rod 152 carried by the piston extends axially through spring 150 and slidably through stub shaft 144. This rod is axially aligned for actuation or depression of a spring loaded push pin 153 which, when depressed, serves to open a normally closed electrical micro switch S–8. Rod 152 is movable to actuate switch S–8 by means of an oil pressured rod piston 154 which is slidable in a bushing 155 of a cylinder 156 axially mounted to the rear of cylinder 138. The forward end of rod 154 abuts against the rear of the pressure piston 148, while its rear end terminates in a pressure build-up well 157 formed in the end of cylinder 156. The well 157 is adapted for connection with a restricted branch line 158 of the hydraulic pressure output line 116 of a hydraulic fluid pressure system 121 of an associated hydraulic ram or press 125. As the hydraulic pressure in the output line 116 acting against the press 125 rises above a predetermined value it acts over the branch line 158 against the rod 154 to progressively move the actuator rod 152 toward the push pin 153 of switch S–8; and when the pressure develops to a predetermined maximum, the rod 152 is caused to actuate switch S–8 to open condition. Switch S–8 is incorporated in a suitable circuit system C serving to control the operations of the hydraulic press 125 and the associated hydraulic pressure fluid system 121; and when switch S–8 is actuated to open condition, the open switch serves to de-energize the circuit system which is adapted as a consequence to automatically discontinue further operation of the hydraulic fluid pressure system and of the associated press 125. When pressure against the spring loaded push pin 153 is relieved, the latter restores and micro-switch S–8 automatically recloses.

Micro switch S–8 is mounted to an upright 159 of an adjustable carriage 161, so that the position of the push pin may be carried closer to or further from the end of the actuator rod 152 as desired. The lower end of the carriage forms a travel nut 162 which is threaded upon an elongated adjusting screw 163. This screw is journalled for rotation by reduced end portions 164, 165, the latter of which bears in the casing rib 146, and the other of which bears in a front end wall 166 of the casing 135. A travel guide for the carriage is provided by a follower nut 167 which is threaded on the screw rearwardly of the carriage nut. The follower has an upright ear portion in which is fixed an elongated pin 169 which projects freely through a complementary guide hole in the carriage upright 159. A further travel guide for the carriage nut is provided by a rail 170 over which a bifurcated end 160 of the carriage upright 159 rides as the carriage moves. It can now be seen that switch S-8 will be carried nearer to or further from the end of the actuator rod accordingly as the screw 163 is rotated in one direction or the other. The adjusting screw 163 is rotated by manually turning a mirco-dial fitting 172 fastened onto an external extension of the reduced end 164 of the screw.

The pressure control device further includes an index disc or collar 173 which is fixed to a shaft 174. The latter is borne for rotation in bearing means at 175 supported in the front end wall of casing 135. Disc 173 carries on its rear face a set of eight pins or set screws, designated in order A to H (FIG. 3). These pins are arranged in spaced relation to each other in two arcuate rows. The pins in the lower row are in alternate spaced relation to those in the upper row. Each pin is of a different length in its projection from the face of disc 173. The arrangement is such that, as the index disc is rotated in one direction or the other, a different one of the pins is successively brought into opposed spaced register with a narrow vertical rib portion 176 of the switch carriage. As the latter is caused to travel on screw 163 away from the actuator rod 152, its travel will be stopped as the rib comes into abutment with the particular pin then registering with it. Each pin, in order, represents a maximum pressure limit of 5, 10, 15, 20, 30, 50, 75 and 100 thousand lbs. Accordingly, the setting of the pins predetermines the distance the actuator rod must move to actuate switch S-8 to terminate operation of the associated compressor system 121. The pressure which each particular pin represents predetermines the maximum pressure that must be developed over the main oil line 116 and in the branch line 158 in order to move the actuator rod 152 sufficiently to actuate switch S-8 to open condition.

When the pressure developed over the branch oil line 158 is sufficient to overcome the load of spring 150, the piston 148 and sleeve 141 move together as a unit to carry the actuator rod 152 toward the pressure switch S-8. This unitary movement of sleeve and piston is due to the load of the heavy high pressure spring 149 within the sleeve acting on the piston. Movement of the sleeve and piston as a unit occurs where the pressure setting is 15,000 lbs. or less. Where the pressure setting is above 15,000 lbs. blocking means is provided to block movement of the sleeve, so that the piston will be required to move against the combined loads of the low and high pressure springs 150, 149. The blocking means includes three fixed pins 181 projecting from the rear face of a retainer plate 182. The pins are of equal length and located circumferentially equally apart. Plate 182 is rotatable on the stub shaft 144, and is adapted to bear against the supporting inner face of the radial support 146 as it rotates. A connecting shaft 180 fixed in disc 173 and plate 182 permits plate 182 to be rotated by rotating disc 173. An opening is provided in the support 146 to enable shaft 180 to rotate with disc 173. In the D to H settings of the index disc, the blocking pins 181 are located in opposed relation to the solid end wall area 143 of the sleeve 141 and in close proximity thereto, so that movement of the sleeve to the left is blocked. In the A to C settings of the index disc, these blocking pins are clear of the solid area of the end wall 143 and are individually in register with a separate longitudinal channel 184 formed in the surface of the sleeve. In this latter position, the blocking pins permit the sleeve to move forwardly, and they enter the channels as it does so. A radial finger 185 of the casing depends into the mid-area of one of the channels and serves to prevent sleeve 141 from rotating as it moves forwardly.

The index disc 173 is rotatable by manually turning a substantially triangular semaphore plate 186. The latter is fixed at its vertex upon an external projecting end of the index disc shaft 174. So as to avoid interference of the semaphore plate with the projecting shaft portion 164 of the carriage screw 163, the semaphore plate has an arcuate slot 187 through which the said end of the carriage screw freely projects. Visible pressure limit markings from 5,000 to 100,000 lbs. corresponding to the pressure limits of the index pins are on the semaphore plate. As the latter is rotated in one direction or the other, each marking is brought successively into register with a window 188 of a collar member 199 sleeving over the micro-dial 172 and fixed to a strap plate 189 adapted to be mounted to a face of the support 137. The reading in the window indicates the corresponding pressure limit pin then in register with the carriage rib 176.

In setting the pressure device to a desired cut-off pressure at which operation of the associated compressor system 121 will cease, the semaphore plate 186 is rotated until the desired pressure marking is visible in the window 188. The micro-dial 172 is then rotated clockwise (FIG. 2) until the rib 176 of the switch carriage abuts the set pin. If a pressure less than the maximum pressure reading in the window is desired, then, after the micro-dial has been rotated as indicated, it is rotated in the reverse direction a proportionate number of turns calculated to bring the carriage switch nearer to the actuator rod in accordance with the pressure limit desired.

While an embodiment of the invention has been illustrated and described in detail, it is to be expressly understood that the invention is not limited thereto. Various changes can be made in the design and arrangement of the parts without departing from the spirit and scope of the invention.

What is claimed is:

1. A maximum hydraulic pressure control device comprising a housing having a hydraulic pressure control chamber adapted to be connected in an output hydraulic pressure line; an electrical control switch adapted to be connected in a circuit; a carriage mount in the housing carrying the switch; a piston movable under direct application thereto of hydraulic pressure fluid entering the chamber to actuate the switch; a spring load restraining movement of the piston until hydraulic pressure is developed in the chamber sufficient to overcome the spring load; manually operable means for moving the carriage mount so as to adjust the location of the switch relative to the piston; and the piston having a range of movement enabling it to actuate the switch in any selected adjusted position of the carriage mount; wherein the carriage mount is a travel nut, the means for moving the carriage is a manually rotatable screw journalled in the housing and threadedly engaging the travel nut, means is provided for guiding the nut so as to permit travel thereof relative to the piston along the screw as the latter is rotated; wherein abutment means is manually settable in the path of the travel nut in a direction away from the piston and serves to predetermine the distance the piston must travel against the spring load to actuate the switch; wherein the distance the piston must travel against the spring load corresponds to a specific hydraulic pressure value, and visible means corresponding to this pressure value is associated with the settable abutment means; and, wherein the abutment means comprises a disc plate supported in the housing for manual rotation and having a plurality of pins in arcuate spaced relation to each other extending in parallel relation to the screw, the pins being successively alignable with an end of the travel nut as the disc plate is rotated, and each pin being of a different length, whereby the distance the travel nut is adjustable on the screw relative to the piston is predetermined by the length of the particular pin then aligned with the travel nut.

2. A maximum fluid pressure control device comprising a housing having a pressure control chamber adapted to be connected in a fluid pressure supply line; an electrical control switch; a carriage mount in the housing supporting the switch; a piston arranged in the housing in opposed spaced relation to the switch movable by pressure fluid in the chamber to actuate the switch; a spring load restraining movement of the piston until pressure is developed in the chamber sufficient to overcome the spring load; and means for adjusting the position of the carriage mount and as a consequence the position of the switch relative to the piston,, said means comprising a first means for interposing selective limits to the extent of adjustment of the switch relative to the piston and a second means for providing a fine adjustment of the position of the switch away from the selected limit.

3. A maximum fluid pressure control device comprising a housing having a pressure control chamber adapted to be connected to a fluid pressure supply line, an electrical control switch in the housing, a piston arranged in opposed space relation to the switch and movable under pressure of fluid in the chamber to actuate the switch, a pair of springs for restraining movement of the piston until pressure develops in the chamber sufficient to overcome resistance of the springs, one of the springs continuously affording a yieldable resistance to the movement of the piston, and the other spring being movable by and as a unit with the piston, selective means for blocking said movement of the said other spring so that the piston is caused to move against the combined resistance of both springs, means for selectively varying the degree of the spring load; and means for selectively adjusting the spaced relation of the switch relative to the piston.

4. A maximum fluid pressure control device comprising a housing having a pressure control chamber adapted for connection with a variable fluid pressure line, an electrical control trip switch supported within the housing, actuating means disposed in opposed spaced relation to the switch actuable under pressure of fluid in the chamber to trip the switch, yieldable means restraining movement of the actuating means until fluid pressure develops in the chamber sufficient to overcome the said yieldable means, means for selectively adjusting the spaced relation of the switch relative to the actuating means, manually operable means for interposing selective limits to the extent of such spacing of the switch, and means for selectively varying the resistance of the yieldable means.

5. A maximum fluid pressure control device as defined in claim 4, wherein the yieldable means comprises a pair of coil springs one of which is a main spring yieldably resisting movement of the actuating means and the other of which is normally disabled from resisting such movement, and wherein the means for selectively varying the resistance of the yieldable means comprises manually operable means for selectively combining with, or disassociating the resistance of the said other coil spring from the main spring.

6. A maximum fluid pressure control device as defined in claim 5, wherein the actuating means comprises a piston, the main spring continually affords a yieldable resistance to movement of the actuating means, the said other spring normally moves as a unit with the piston, and the means for selectively varying the resistance of the yieldable means comprises selective means for placing an abutment in the path of movement of said other spring.

7. In a maximum fluid pressure control device for controlling high pressure fluid systems, including a housing having a pressure control chamber adapted for connection with a fluid pressure line, an electric control switch, a piston arranged in opposed spaced relation to the switch movable under pressure of fluid developing in the chamber to actuate the switch, and yieldable means resisting movement of the piston until a sufficient pressure has developed in the chamber to overcome the said resistance; an elongated screw journaled at its ends in the housing extending in parallel relation to and forwardly of the piston, a travel nut carrying the switch in the path of the piston threaded upon the screw and movable along the screw in one direction or the other relative to the piston accordingly as the screw is rotated, guide means restraining rotation of the travel nut but allowing axial movement thereof along the screw as the screw is rotated, manually operable means for interposing selectively abutments in the path of travel of the nut in a direction away from the piston, and other manually operable means for rotating the screw to adjustably position the travel nut relative to the selected abutment.

8. In a control device according to claim 7 wherein the other manually operable means includes a micro dial fitting fastened on an end of the screw.

9. In a control device as in claim 7, wherein the manually operable means for interposing selectively abutments in the path of travel of the nut comprises a manually rotatable disc, a plurality of abutments defined by pins projecting from the disc in circumferentially spaced relation to one another and in parallel relation to the screw, each pin being successively positionable in the path of the travel nut upon a predetermined degree of rotation of the disc, and the pins varying in length from one another whereby the range of travel of the travel nut in a direction away from the piston is determinable by the length of the pin positioned in its path.

10. In a maximum fluid pressure control device including a housing having a pressure control chamber adapted for connection with a fluid pressure line, an electric circuit control switch, a piston arranged in opposed spaced relation to the switch movable under pressure of fluid developing in the chamber to operate the switch, means for selectively predetermining the extent of travel required of the piston to operate the switch and selective means for yieldably resisting movement of the piston, the latter means comprising a first spring load constantly resisting movement of the piston, a second spring load, and manually operable means for associating the second spring load with the piston having either of two selectable conditions, a first condition wherein the second spring load is enabled to move as a unit with the piston, and a second condition wherein the second spring load is caused to yieldingly resist movement of the piston.

11. In a maximum fluid pressure control device including a housing having a pressure control chamber adapted for connection with a fluid pressure line, an electric control switch, a piston arranged in opposed spaced relation to the switch movable toward the switch to operate the same in response to pressure developing in the chamber, compressible means yieldingly resisting said movement of the piston, a screw disposed parallel to and forwardly of the piston, a carriage nut carrying the switch in the path of the piston having guided travel along the screw relative to the piston, the screw being journaled in the housing and having threaded engagement with the nut for causing the nut to travel along the screw away from or toward the piston accordingly as the screw is rotated in one direction or the other, manually settable means for blocking travel of the nut away from the piston to a selected one of a plurality of different positions, manually operable means for rotating the screw to locate the nut relative to the selected position, and indicia means for indicating as a consequence of the operation of the settable means the pressure required to be developed to overcome the resistance of the compressible means to move the piston sufficiently to operate the switch in the selected position of the nut.

12. In a maximum fluid pressure control device for use in controlling a high pressure fluid system, including a housing having a pressure control chamber adapted for connection with a fluid pressure line, a rod slidable in the housing under pressure developing in the chamber at one end of the rod, a sleeve slidable in the housing having a piston movable therein abutting the opposite end of the rod, a yieldable spring confined within the sleeve between the piston and a forward end of the sleeve, the sleeve having a first condition wherein it is slidable in the housing together with the piston and spring as a unit under pressure applied to the rod, selective means settable in the path of the sleeve preventing movement of the sleeve so that the sleeve has a second condition wherein the piston is movable relative thereto against the resistance of the spring, a control switch within the housing, a switch operating rod separate from the switch and extending from the piston freely through the forward end of the sleeve, and a second yieldable spring extending freely through the forward end of the sleeve providing a constant yieldable resistance to the forward movement of the piston.

13. In a maximum pressure control device as in claim 12 wherein means is provided for selectively adjusting the position of the switch relative to the switch operating rod.

14. In a maximum pressure control device as in claim 13, wherein means is provided for selectively blocking adjustment of the switch in a direction away from the switch operating rod to any one of a plurality of selective positions.

References Cited in the file of this patent
UNITED STATES PATENTS

| | | |
|---|---|---|
| 851,691 | Newell | Apr. 30, 1907 |
| 1,140,937 | Ashelman et al. | May 25, 1915 |
| 2,395,007 | Leupold | Feb. 19, 1946 |
| 2,650,275 | Doutt | Aug. 25, 1953 |
| 2,900,578 | Marbury | Aug. 18, 1959 |